(12) United States Patent
Sendik

(10) Patent No.: US 9,105,100 B2
(45) Date of Patent: Aug. 11, 2015

(54) MOTION ESTIMATION DEVICE AND MOTION ESTIMATION METHOD

(71) Applicant: SAMSUNG ELECTRONICS CO., LTD., Suwon-si, Gyeonggi-Do (KR)

(72) Inventor: Omry Sendik, Tel-Aviv (IL)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 104 days.

(21) Appl. No.: 14/067,303

(22) Filed: Oct. 30, 2013

(65) Prior Publication Data
US 2014/0226033 A1 Aug. 14, 2014

(30) Foreign Application Priority Data
Feb. 8, 2013 (KR) .......................... 10-2013-0014293

(51) Int. Cl.
| | | |
|---|---|---|
| H04N 5/228 | (2006.01) | |
| G06T 7/20 | (2006.01) | |
| H04N 5/232 | (2006.01) | |
| H04N 19/51 | (2014.01) | |
| H04N 19/43 | (2014.01) | |

(52) U.S. Cl.
CPC ............ G06T 7/2013 (2013.01); H04N 5/2329 (2013.01); H04N 19/43 (2014.11); H04N 19/51 (2014.11)

(58) Field of Classification Search
CPC ............ H04N 5/23267; H04N 5/2327; H04N 5/23274; H04N 5/23277; H04N 5/2329; H04N 5/23264; H04N 5/23248
USPC ....................... 348/208.99, 208.4, 208.6, 155
See application file for complete search history.

(56) References Cited

U.S. PATENT DOCUMENTS

| | | | |
|---|---|---|---|
| 7,298,401 B2 | 11/2007 | Baer | |
| 7,844,134 B2 | 11/2010 | Sasaki et al. | |
| 7,936,945 B2 | 5/2011 | Soinio et al. | |
| 8,358,359 B2 | 1/2013 | Baker et al. | |
| 2007/0177037 A1* | 8/2007 | Kurata | .......................... 348/241 |
| 2007/0297026 A1 | 12/2007 | John | |
| 2010/0158493 A1* | 6/2010 | Miyasako | ....................... 396/55 |
| 2011/0211082 A1 | 9/2011 | Forssen et al. | |
| 2012/0092559 A1 | 4/2012 | Ubillos | |
| 2013/0176447 A1* | 7/2013 | Nakashima | ................ 348/208.4 |
| 2014/0354835 A1* | 12/2014 | Pakin et al. | ................. 348/208.6 |

FOREIGN PATENT DOCUMENTS

| | | |
|---|---|---|
| JP | 2006-058945 | 3/2006 |
| JP | 2010-271379 | 12/2010 |
| KR | 1020070003324 | 1/2007 |
| KR | 1020090023632 | 3/2009 |

* cited by examiner

*Primary Examiner* — Tuan Ho
*Assistant Examiner* — Zhenzhen Wu
(74) *Attorney, Agent, or Firm* — F.Chau & Associates, LLC

(57) ABSTRACT

A motion estimation method includes grouping row blocks of a first frame into a first plurality of banks and grouping row blocks of a second frame into a corresponding second plurality of banks, respectively; calculating the normalized cross correlation (NCC) or the sum of absolute difference (SAD) between the banks of the first frame and the banks of the second frame; detecting the local maxima from the NCC or the local minima from the SAD; estimating a first relative displacement between corresponding reference row blocks of the first frame and of the second frame; calculating motion coefficients using first relative displacements; and estimating second relative displacements using the motion coefficients.

18 Claims, 12 Drawing Sheets

1st frame　　　2nd frame

Image sensor traveling
constant velocity

1st frame　　　2nd frame

Image sensor traveling
non-constant velocity

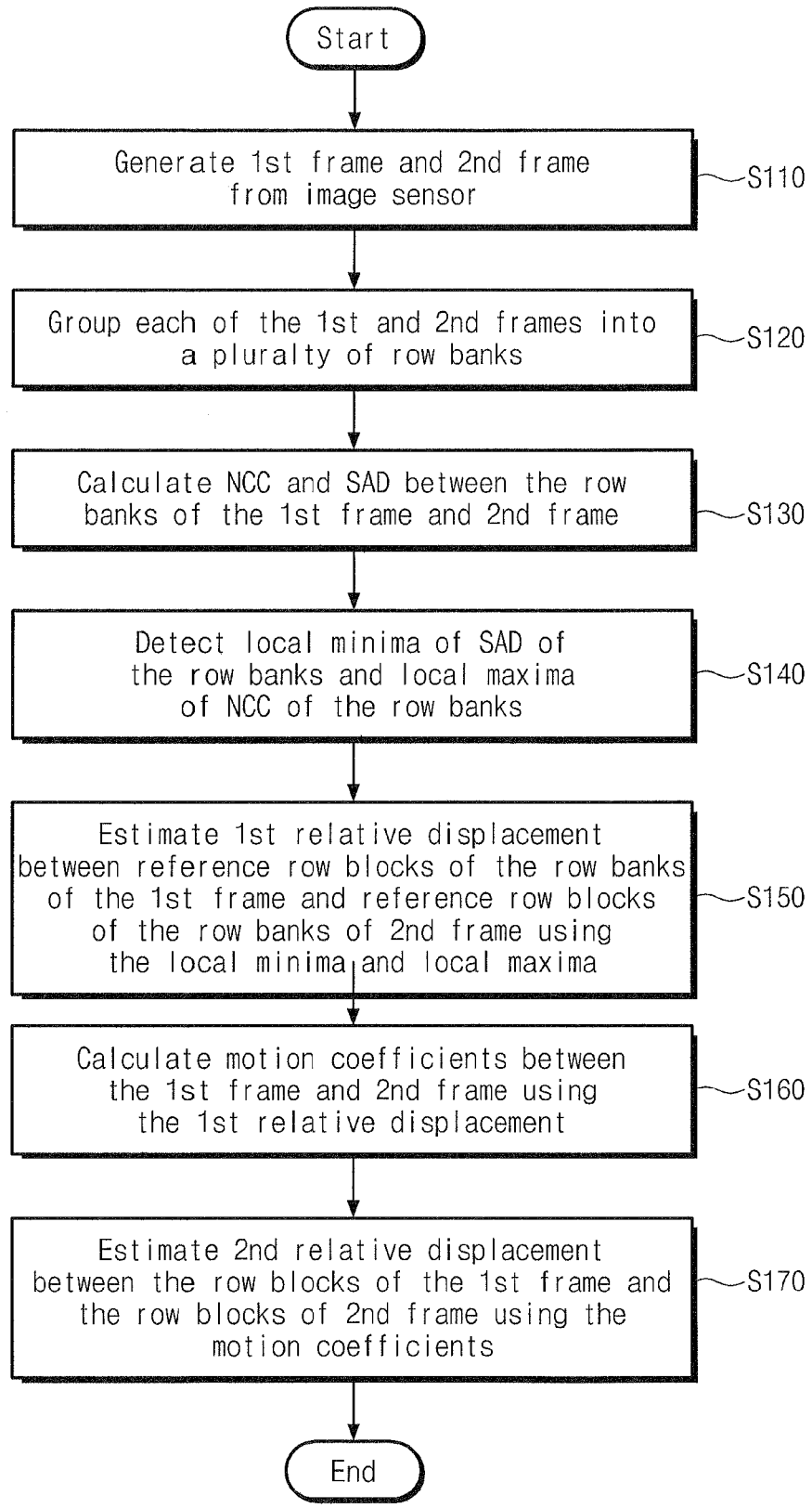

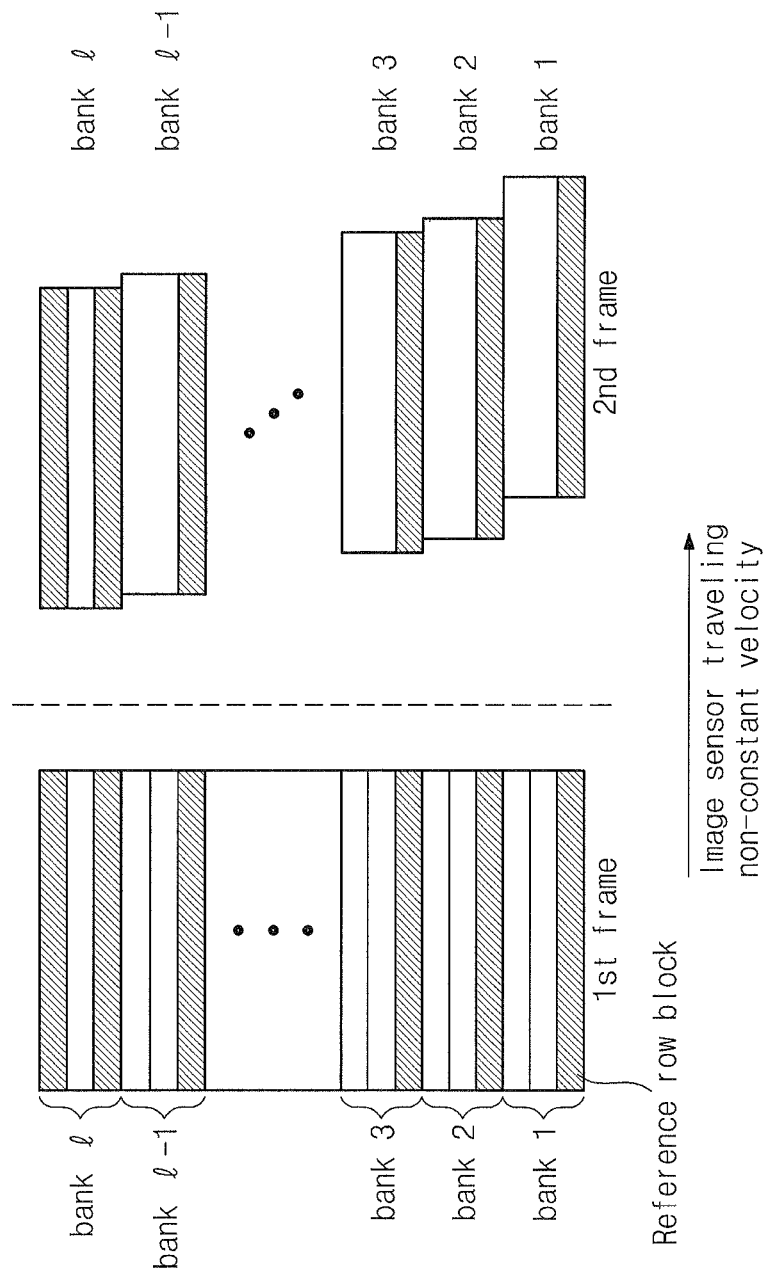

Fig. 5A
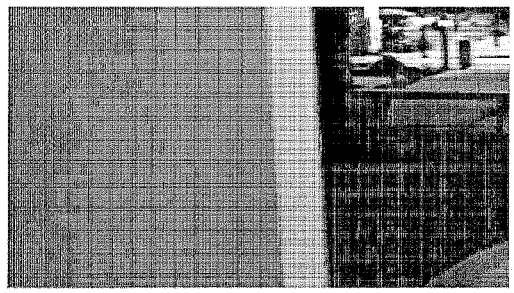
1st frame
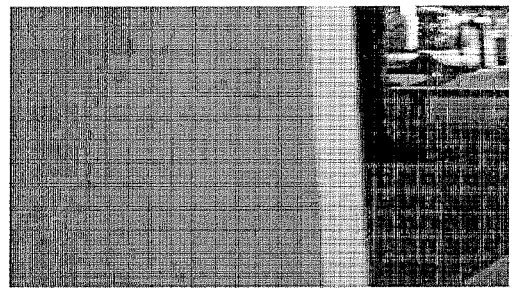
2nd frame

Fig. 6
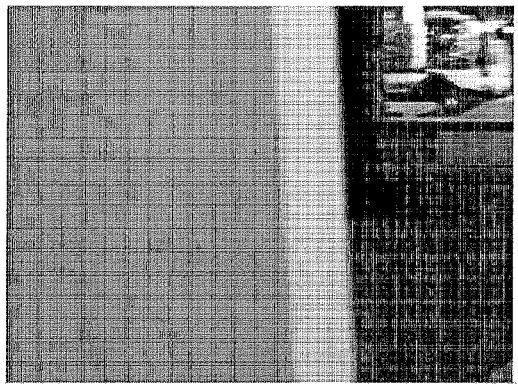
1st frame
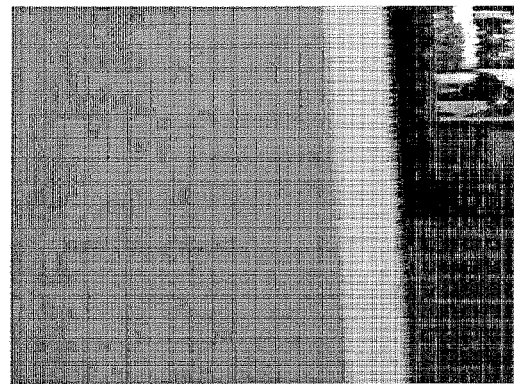
2nd frame
Fig. 7
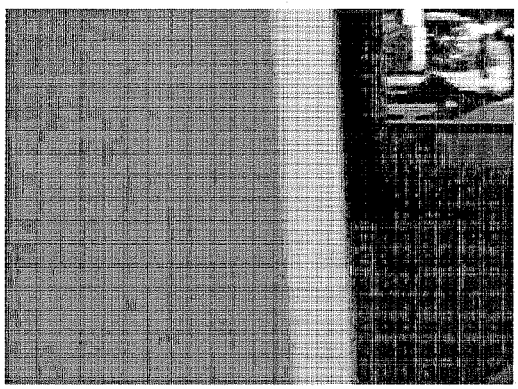
1st frame
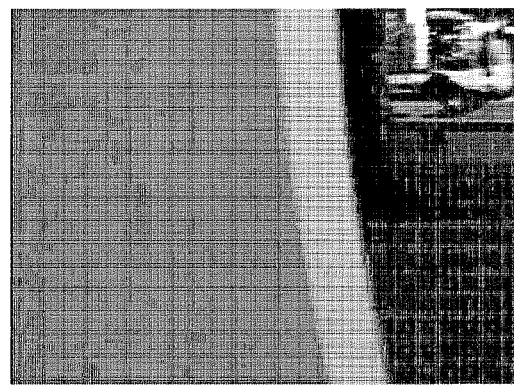
2nd frame
Fig. 8
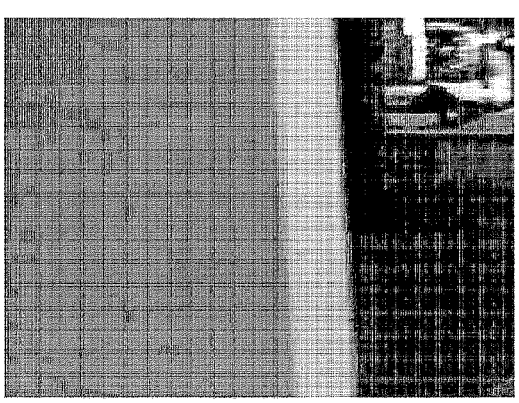
1st frame
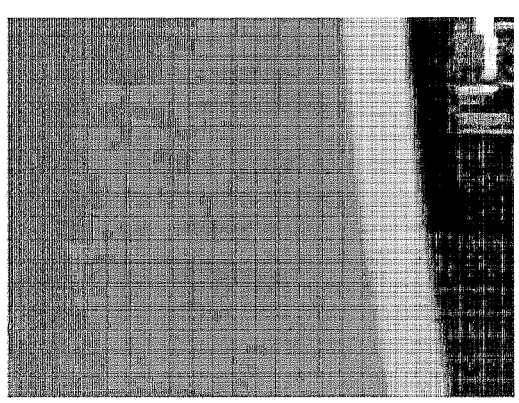
2nd frame

MOTION ESTIMATION DEVICE AND MOTION ESTIMATION METHOD

CROSS-REFERENCE TO RELATED APPLICATIONS

This application claims priority under 35 USC §119 to Korean Patent Application No. 10-2013-0014293 filed on Feb. 8, 2013, the disclosure of which is incorporated by reference in its entirety.

1. Technical Field

The present general inventive concept relates to motion estimation devices and motion estimation methods and, more particularly, to a motion estimation device and a motion estimation method for estimating motion between images captured by an image sensor.

2. Discussion of the Related Art

There is an increasing demand for imaging apparatuses for imaging various types of scenes. In addition, much research and development (R&D) has been focused on related fields.

A familiar example of imaging apparatuses is a digital camera. Typically, a digital camera scans a target using the rows of an array in an image sensor and stores scanned information. A typical digital imaging apparatus such as a digital camera or a camera phone using an image sensor also uses a mechanical shutter or a rolling shutter. A digital camera using a mechanical shutter typically does not suffer from image distortion because all the regions of an image sensor equally receive light while the shutter is opened. Meanwhile, a digital camera using a rolling shutter may suffer from image distortion when an imaging target is moving or when the imaging apparatus moves. The image distortion may have an influence on motion estimation of images.

SUMMARY

An aspect of the inventive concept provides a motion estimation method may include grouping the row blocks of a first frame into a first plurality of banks and grouping the row blocks of a second frame into a corresponding second plurality of banks wherein one row block in each of the first plurality of banks is deemed a reference row block; calculating the normalized cross correlation (NCC) or the sum of absolute difference (SAD) between each bank of the first frame and the corresponding bank of the second frame; detecting the local maxima of the NCC or the local minima of the SAD; estimating a first relative displacement between each reference row block of the banks of the first frame and the corresponding banks of the second frame by using the local maxima or the local minima; calculating motion coefficients of the reference row blocks by using the first relative displacement; and estimating a second relative displacement between the corresponding row blocks of the first frame and the second frame by using the motion coefficients.

In an exemplary embodiment, the first frame and the second frame may be image frames that are successive in time.

In an exemplary embodiment, calculating motion coefficients of the reference row blocks by using the first relative displacement may include calculating the motion coefficients based on a motion equation describing motion between the corresponding reference row blocks of the first frame and of the second frame.

In an exemplary embodiment, the motion equation may be derived based on a motion equation describing motion between the row blocks of the first frame and the row blocks of the second frame.

In an exemplary embodiment, the motion coefficients may include velocity, acceleration, and jolt.

In an exemplar embodiment, each of the banks may include at least one reference row block.

In an exemplary embodiment, the banks of the first frame and the banks of the second frame may include the same number of row blocks.

According to an aspect of the inventive concept, an estimation device includes an image processor configured to process a first frame and a second frame that are sequentially input and configured to group pluralities of row blocks of each of the first and second frames into pluralities of banks. The image processor includes a calculation unit configured to calculate the normalized cross correlation (NCC) or the sum of absolute difference (SAD) of the banks of the first frame and the corresponding banks of the second frame; a detection unit configured to detect the local maxima of the NCC or the local minima of the SAD; and an estimation unit configured to calculate a first relative displacement between corresponding reference row blocks of the corresponding banks of the first frame and the second frame by using the local maxima or the local minima. The calculation unit calculates a motion coefficient between the reference row blocks by using the first relative displacement, and the estimation unit estimates a second relative displacement between corresponding row blocks of the first frame and the second frame by using the motion coefficient.

In an exemplary embodiment, the motion estimation device further includes an image sensor configured to generate the first frame and the second frame. The image sensor may be a CMOS image sensor. The CMOS image sensor generates the first and second frames each including a plurality of row blocks.

In an exemplary embodiment, the image sensor may use a rolling shutter scheme.

In an exemplary embodiment, the first and second frames may be image frames that are successive in time.

In an exemplary embodiment, the banks of the first frame and the banks of the second frames each include one reference row block deemed a reference row block.

In an exemplary embodiment, the motion coefficient includes velocity, acceleration, and jolt. The calculation unit calculates the motion coefficient, based on a motion equation describing motion between the corresponding reference row blocks of the respective banks of the first frame and the respective banks of the second frame.

In an exemplary embodiment, the estimation unit estimates the second relative displacement, based on a motion equation describing motion between the row blocks of the first frame and the row blocks of the second frame.

In an exemplary embodiment, the banks of the first frame and the banks of the second frame may include the same number of the reference row blocks per bank.

The inventive concept will now be described more fully hereinafter with reference to the accompanying drawings, in which preferred embodiments of the inventive concept are shown. However, the inventive concept may be embodied in many different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

The inventive concept relates motion estimation devices and motion estimation methods and, more specifically, to a motion estimation device and a motion estimation method for estimating motion between images captured by an image sensor. Hereinafter, embodiments of the inventive concept will now be described with reference to accompanying drawings so that those skilled in the art would be able to easily embody the inventive concept.

BRIEF DESCRIPTION OF THE DRAWINGS

The inventive concept will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the inventive concept. In the figures:

FIG. 3 is a flowchart illustrating a motion estimation method according to an embodiment of the inventive concept;

FIG. 4 illustrates image distortion and more specifically illustrates step S120 in the method of FIG. 3;

FIGS. 5A, 5B and 5C illustrate image distortion and more specifically illustrate step S130 in the method of FIG. 3;

FIGS. 6, 7 and 8 illustrate examples to which the motion estimation method described in FIG. 3 is applied;

DETAILED DESCRIPTION OF EXEMPLARY EMBODIMENTS

Figure 1:
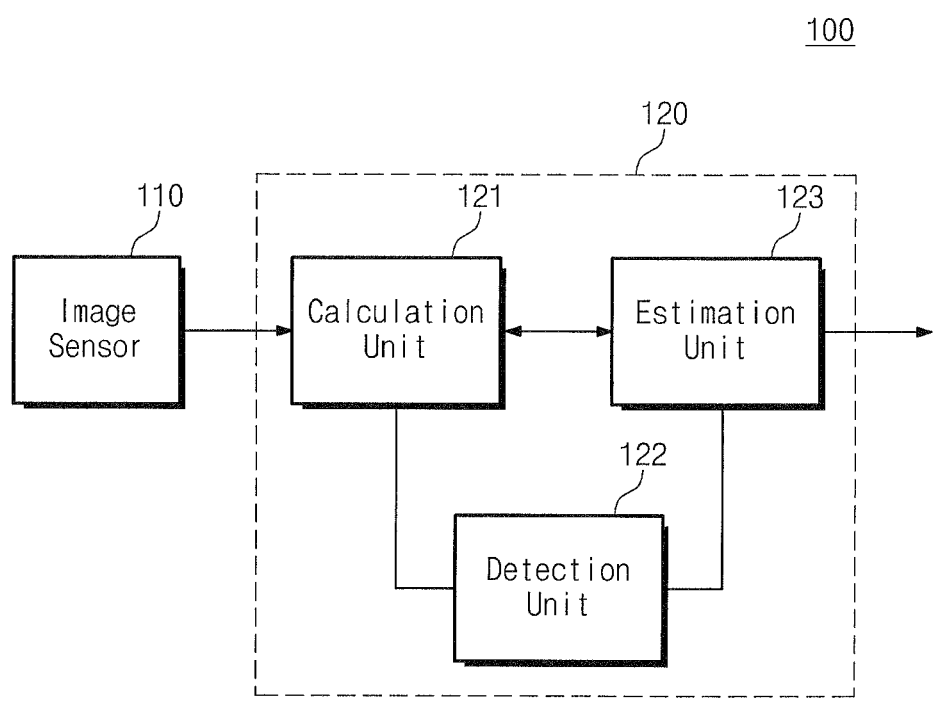
FIG. 1 is a block diagram of a motion estimation device according to an embodiment of the inventive concept.

FIG. 1 is a block diagram of a motion estimation device 100 according to an exemplary embodiment of the inventive concept. As shown in FIG. 1, the motion estimation device 100 includes an image sensor 110 and an image processor 120.

The image sensor 110 captures image pixels representing an external environment and an object(s) in the scene to output an image frame (e.g., digital image data) or frames (e.g., digital video data). An object in the scene can be a target person or a thing. The image sensor 110 can transfer image frames successively captured according to a predetermined frame rate to the image processor 120. Hereinafter, let it be assumed that the image sensor 110 is, for example, a CMOS image sensor.

The image sensor 110 may employ, for example, a rolling shutter scheme. It may be understood that the rolling shutter scheme is a scheme where photodiodes of the image sensor are sequentially exposed and read in units of row blocks (row by row) to scan an entire image. When the image sensor 110 using the rolling shutter scheme moves horizontally while capturing an object or when the object moves horizontally, distortion may occur between the successive image frames.

Such distortion is known as a "rolling shutter skew", which causes an object to appear to be skewed in a direction opposite to the travel direction of the image sensor 110. When the image sensor 110 or the object moves at constant velocity, the rolling shutter skew may occur in a linearly skewed form. This will be described in further detail later with reference to FIGS. 2A and 2B.

When the image sensor or the object moves at non-constant velocity, motion of row blocks between captured image frames may be described using velocity, acceleration, jolt or the like. The jolt means the amount of change in acceleration with respect to time. Hereinafter, the operation of the image processor 120 will be described with respect to captured image frames when the image sensor 110 or the object moves at a constant velocity. However, the inventive concept may extend to a case where the image sensor 110 or the object moves at non-constant velocity.

The image processor 120 may process image frames received from the image sensor 110. Specifically, the image processor 120 may estimate motion between the successive image frames received from the image sensor 110. For the convenience of description, hereinafter, let it be assumed that among the successive image frames, an image earlier in time will be referred to as a first frame. And image frames transferred to the image processor 120 after the first frame will be referred to as a second frame, third frame, and so on. Each of the first and second frames include a plurality of row blocks.

The image processor 120 includes a calculation unit 121, a detection unit 122, and an estimation unit 123.

The calculation unit 121 calculates normalized cross correlation (hereinafter referred to as "NCC") or the sum of absolute difference (hereinafter referred to as "SAD") in units of row banks respectively corresponding to the first and second frames transferred from the image sensor 110. In one aspect, it may be understood that the NCC or SAD calculation of the calculation unit 120 is measurement of similarity (or difference) between row banks respectively corresponding to the first and second frames.

The NCC and the SAD are calculated to detect the local maximum and the local minimum, respectively. Thus, the calculation unit 121 detects the local maximum with respect to the NCC and detects the local minimum with respect to the SAD.

The calculation unit 121 can calculate NCC of the respective row banks by using Equation (1) below.

$$NXCR(u, v) = \frac{\sum_{m,n} (I_1(m, n) - \mu_1(u))(I_2(m-u, n-v) - \mu_2)}{\sqrt{\sum_{m,n} (I_1(m, n) - \mu_1(u, v))^2 \sum_{m,n} (I_2(m-u, n-v) - \mu_2)^2}} \quad \text{Equation (1)}$$

The calculation unit 121 can calculate SAD by using Equation (2) below.

$$SAD(u, v) = \sum_{m,n} |I_1(m, n) - I_2(m-u, n-v)| \quad \text{Equation (2)}$$

In the Equations (1) and (2), I represents an intensity matrix of each image frame. The intensity is information indicating luminance of each image frame. In addition, u and v represent the relative displacement between image frames, and μ means the average displacement.

The calculation unit 121 receives a relative displacement u and v between reference row blocks of corresponding row banks of the first and second frames from the estimation unit 123 and calculate motion coefficients (e.g., velocity, acceleration, jolt, etc.) between the reference row blocks of corresponding reference row blocks of the first and second frames by using Equation (3) below.

When acceleration (a) is small, the influence of the acceleration (a) on motion between adjacent row blocks in a single frame is substantially negligible. Thus, the calculation unit 121 may calculate motion coefficients only with respect to existing row blocks to estimate motion coefficients of a row bank in which an existing row block is included. In another aspect, it may be understood that the calculated motion coefficients are motion coefficients describing motion of a row bank in which an existing row block is included. Thus, it will be understood that the Equation (3) is described in the form of a motion equation by using velocity (v), acceleration (a), and jolt (j) and the motion equation is expressed as a matrix. The calculation unit 121 transfers the calculated motion coefficients (v, a, and j) to the estimation unit 123.

Equation (3)

$$\begin{pmatrix} T_{frame} & \frac{1}{2}((T_{frame})^2) & \frac{1}{6}((T_{frame})^3) \\ T_{frame} & \frac{1}{2}((T_{frame}+N_{ch}T_{line})^2 - (N_{ch}T_{line})^2) & \frac{1}{6}((T_{frame}+N_{ch}T_{line})^3 - (N_{ch}T_{line})^3) \\ T_{frame} & \frac{1}{2}((T_{frame}+2N_{ch}T_{line})^2 - (2N_{ch}T_{line})^2) & \frac{1}{6}((T_{frame}+2N_{ch}T_{line})^3 - (2N_{ch}T_{line})^3) \\ \vdots & \vdots & \vdots \\ T_{frame} & \frac{1}{2}((T_{frame}+NT_{line})^2 - (NT_{line})^2) & \frac{1}{6}((T_{frame}+NT_{line})^3 - (NT_{line})^3) \end{pmatrix} \begin{pmatrix} v \\ a \\ j \end{pmatrix} = \begin{pmatrix} x_2[0]-x_1[0] \\ x_2[N_{ch}]-x_1[N_{ch}] \\ x_2[2N_{ch}]-x_1[2N_{ch}] \\ \vdots \\ x_2[N]-x_1[N] \end{pmatrix}$$

In the Equation (3), $x_1[k]$ and $x_2[k]$ represent a $k^{th}$ row block of the first frame and a $k^{th}$ row block of the second frame, respectively (k≥0, k being an integer). In addition, N represents the number of row blocks of the first and second frames and $N_{ch}$ represents the number of row blocks included in a row bank. Therefore, $x_1[N_{ch}]$ represents an $(N_{ch})^{th}$ row block of the first frame and $x_2[N_{ch}]$ represents an $(N_{ch})^{th}$ row block of the second frame. In addition, $T_{frame}$ represents time between the first frame and the second frame and $T_{line}$ represents time between row blocks in a single frame.

The Equation (3) may be derived from Equations (4) and (5) below. The Equation (4) indicates a motion equation describing motion between row blocks of the first frame and row blocks of the second frame. The Equation (5) is obtained by expressing the Equation (4) in form of matrix.

Equation (4)

$$x_2[0] - x_1[0] = vT_{frame} + a\frac{T_{frame}^2}{2} + j\frac{T_{frame}^3}{6}$$

$$x_2[1] - x_1[1] = x_2[1] - x_1[0] - vT_{line} - a\frac{T_{line}^2}{2} - j\frac{T_{line}^3}{6}$$

$$= v(T_{frame} + T_{line}) + a\frac{(T_{frame}+T_{line})^2}{2} +$$

$$j\frac{(T_{frame}+T_{line})^3}{6} - vT_{line} - a\frac{T_{line}^2}{2} - j\frac{T_{line}^3}{6}$$

$$x_2[2] - x_1[2] = x_2[2] - x_1[0] - v(2T_{line}) - a\frac{(2T_{line})^2}{2} - j\frac{(2T_{line})^3}{6}$$

$$= v(T_{frame} + 2T_{line}) + a\frac{(T_{frame}+2T_{line})^2}{2} +$$

$$j\frac{(T_{frame}+2T_{line})^3}{6} - v(2T_{line}) - a\frac{(2T_{line})^2}{2} - j\frac{(2T_{line})^3}{6}$$

$$= vT_{frame} + \frac{a}{2}((T_{frame}+2T_{line})^2 - (2T_{line})^2) +$$

$$\frac{j}{6}((T_{frame}+2T_{line})^3 - (2T_{line})^3)$$

$$\vdots$$

$$x_2[N] - x_1[N] = x_2[N] - x_1[0] - v(NT_{line}) - a\frac{(NT_{line})^2}{2} - j\frac{(NT_{line})^3}{6} ==$$

$$v(T_{frame} + NT_{line}) + a\frac{(T_{frame}+NT_{line})^2}{2} + j\frac{(T_{frame}+NT_{line})^3}{6} -$$

$$v(NT_{line}) - a\frac{(NT_{line})^2}{2} - j\frac{(NT_{line})^3}{6} = vT_{frame} +$$

$$\frac{a}{2}((T_{frame}+NT_{line})^2 - (NT_{line})^2) + \frac{j}{6}((T_{frame}+NT_{line})^3 - (NT_{line})^3)$$

Equation (5)

$$\begin{pmatrix} T_{frame} & \frac{1}{2}((T_{frame})^2) & \frac{1}{6}((T_{frame})^3) \\ T_{frame} & \frac{1}{2}((T_{frame}+T_{line})^2 - (T_{line})^2) & \frac{1}{6}((T_{frame})^3 - (T_{line})^3) \\ T_{frame} & \frac{1}{2}((T_{frame}+2T_{line})^2 - (2T_{line})^2) & \frac{1}{6}((T_{frame}+T_{line})^3 - (T_{line})^3) \\ T_{frame} & \frac{1}{2}((T_{frame}+3T_{line})^2 - (3T_{line})^2) & \frac{1}{6}((T_{frame}+2T_{line})^3 - (2T_{line})^3) \\ \vdots & \vdots & \vdots \\ T_{frame} & \frac{1}{2}((T_{frame}+NT_{line})^2 - (NT_{line})^2) & \frac{1}{6}((T_{frame}+NT_{line})^3 - (NT_{line})^3) \end{pmatrix} \begin{pmatrix} v \\ a \\ j \end{pmatrix} = \begin{pmatrix} x_2[0]-x_1[0] \\ x_2[1]-x_1[1] \\ x_2[2]-x_1[2] \\ \vdots \\ x_2[N]-x_1[N] \end{pmatrix}$$

In the Equations (4) and (5), $x_1[k]$ and $x_2[k]$ represent a $k^{th}$ row block of the first frame and a $k^{th}$ row block of the second frame, respectively. In addition, N represents the number of row blocks of the first and second frames. In addition, $T_{frame}$ represents time between the first frame and the second frame and $T_{line}$ represents time between row blocks in a single frame. The $T_{frame}$ and $T_{line}$ may be predetermined depending on the setting. In the Equation (4), "x1[0]=0" may be selected to estimate relative displacement between two image frames (e.g. the first frame and the second frame).

The detection unit 122 detects local maximums with respect to NCCs calculated by the calculation unit 121. The detection unit 122 detects local minimums with respect to SADs calculated by the calculation unit 121.

The estimation unit 123 estimates relative displacement between reference row blocks of corresponding row banks of the first and second frames by using the local maximum and the local minimum detected by the detection unit 122. The estimation unit 123 transfers the detected relative displacement between the reference row blocks to the calculation unit 121. The estimation unit 123 estimates the relative displacement between the corresponding row blocks of the first and second frames by using the received motion coefficients (v, a, and j) and the Equation (5). The estimated relative displacement may be used to generate a motion vector.

As discussed above, the motion estimation device 100 according to an embodiment of the inventive concept estimates relative displacement of the corresponding row blocks of the first and second frames when the image sensor 110 or the object moves at non-constant velocity. In addition, the motion estimation device 100 can calculate the motion coefficients (v, a, and j) of the corresponding row blocks of the first and second frames by using the relative displacement between the corresponding reference row blocks of the first and second frames.

Figure 2A:
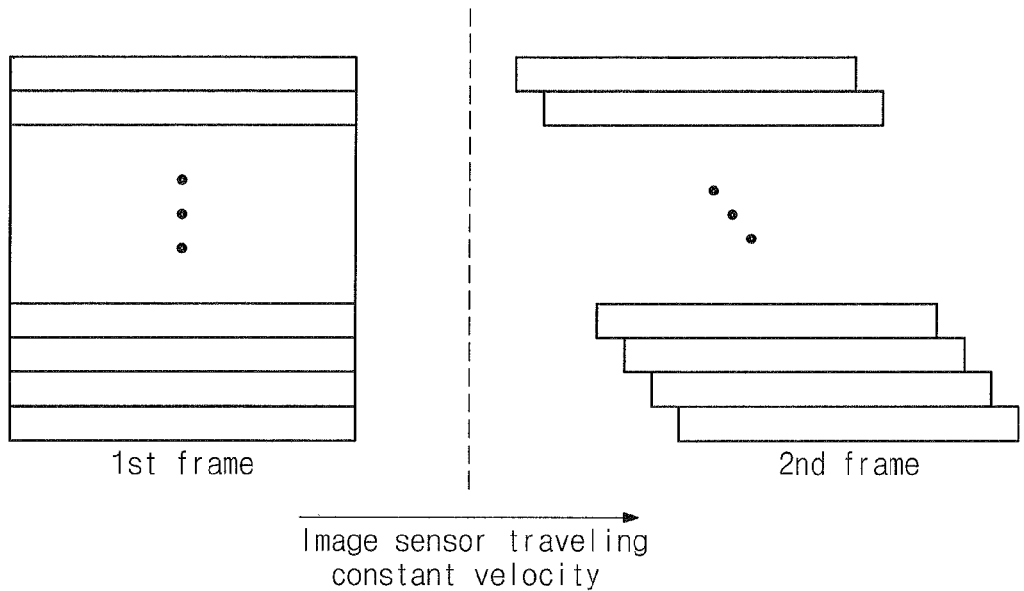
FIGS. 2A and 2B illustrate image distortion caused by a rolling shutter effect.
Figure 2B:
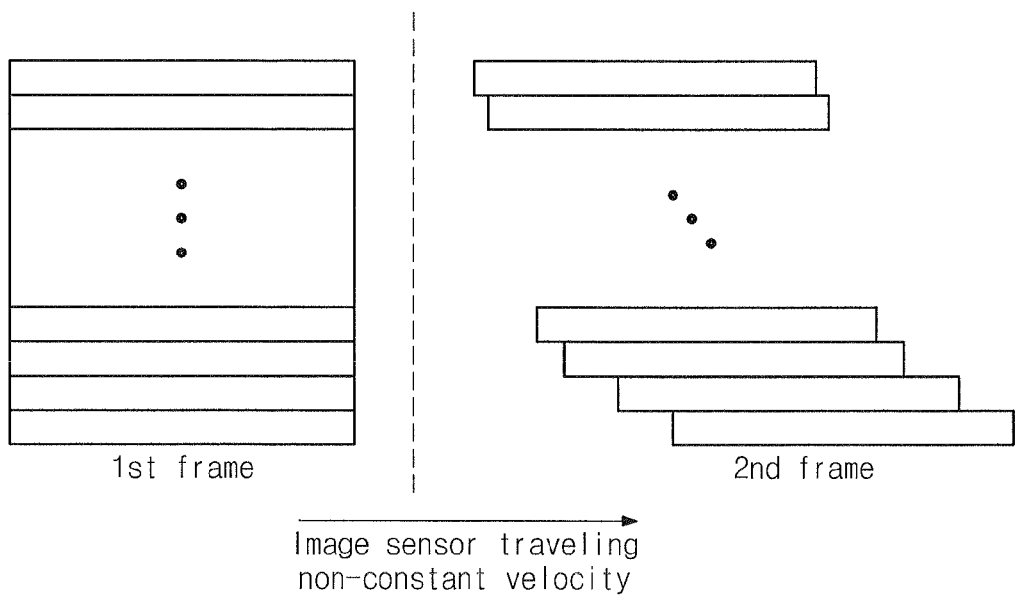

FIGS. 2A and 2B illustrate image distortion caused by a rolling shutter effect. In FIGS. 2A and 2B, there is assumed a case where the image sensor 110 moves horizontally. In FIGS. 2A and 2B, a first frame may be an image frame captured before the image sensor 110 moves and the second frame may be an image sensor captured while the image sensor 110 moves.

FIG. 2A shows a case where the image sensor 110 moves horizontally at constant velocity. In the case where the image sensor 110 moves horizontally at constant velocity, respective blocks of a second frame may appear to be skewed in the form of uniform steps. Thus, the row blocks of the second frame may appear to be skewed at regular intervals in a direction opposite to the travel direction of the image sensor 110.

FIG. 2B shows a case where the image sensor 110 moves horizontally at non-constant velocity. In the case where the image sensor 110 moves horizontally at non-constant velocity, the respective blocks of the second frame may also appear to be skewed in form of unequal steps. The row blocks of the second frame may appear to be skewed at irregular intervals in a direction opposite to the travel direction of the image sensor 110.

FIG. 3 is a flowchart illustrating a motion estimation method according to an exemplary embodiment of the inventive concept. As illustrated, the motion estimation method includes generating a first frame and a second frame from an image sensor 110 (step S110), grouping each of the first and second frames into a plurality of row banks (step S120), calculating NCC or SAD between the row banks of the first and second frames (step S130), detecting local minima of NCCs or local maxima of SADs (step S140), estimating first relative displacement between reference row blocks of corresponding row banks of the first and second frames by using the local minima and the local maxima (step S150), calculating motion coefficients of corresponding reference row blocks of the first and second frames by using the first relative displacement (step S160), and estimating second relative displacement of the corresponding row blocks of the first and second frames by using the motion coefficients of the row blocks of the first and second frames (step S170). Hereinafter, the steps S110 to step S170 will be described in detail below.

At step S100, the image sensor 110 captures the images of an external environment and/or an object to generate a first frame and a second frame that are successive in time. An image earlier in time will be referred to as a first frame and an image frame transferred to the image processor 120 following the first frame will be referred to as a second frame. Each of the first and second frames includes a plurality of row blocks. The first frame may be an image frame captured when the image sensor 110 or the object is stopped or when the image sensor 110 or the object moves. The second frame may be an image frame captured while the image sensor 110 or the object moves.

At step S120, the calculation unit 121 may group each of the first and second frames into a plurality of row banks. Each of the row banks may include a plurality of row blocks.

At step S130, the calculation unit 121 calculates NCC or SAD between corresponding row banks of the first and second frames. Specifically, the calculation unit 121 calculates NCC or SAD by using the above-described Equations (1) and (2).

At step S140, the detection unit 122 detects local maxima with respect to NCCs and/or detects local minima with respect to SADs between the corresponding row banks of the first and second frames.

At step S150, the estimation unit 123 estimates the first relative displacement between reference row blocks of the corresponding row banks of the first and second frames by using the local maxima or the local minima detected by the detection unit 122.

At step S160, the calculation unit 121 calculates motion coefficients (v, a, and j) between corresponding reference row blocks of the first and second frames by using the first relative displacement estimated by the estimation unit 123. For example, the calculation unit 121 calculates the motion coefficients (v, a, and j) using the above-described Equation (3).

At step S170, the estimation unit 123 estimates second relative displacement of the corresponding row blocks of the first and second frames by using the motion coefficients (v, a, and j) calculated by the calculation unit 121.

FIG. 4 illustrates image distortion and more specifically illustrates step S120 of the method of FIG. 3.

Referring to FIG. 4, a first frame and a second frame is shown. The first frame is assumed to be an image frame captured before the image sensor 110 moves. The second frame is assumed to be an image frame captured while the image sensor 110 horizontally moves at non-constant velocity.

Each of the first and second frames includes a plurality of row blocks. The row blocks of each of the first and second frames can be grouped into a plurality of row banks. Thus, each of the row banks includes a plurality of row blocks. For example, the calculation unit 121 of the image processor 120 can group row blocks of each of the first and second frames into a plurality of row banks. In FIG. 4, each of the row banks includes three row blocks. However, this is just exemplary and the inventive concept is not limited thereto. Each of the row banks may include a reference row block. As explained with reference to the Equation (3), the reference row block may mean a row block having a minimum k value among the row blocks included in the row banks and a row block having a maximum k value in a frame.

Figure 5B:
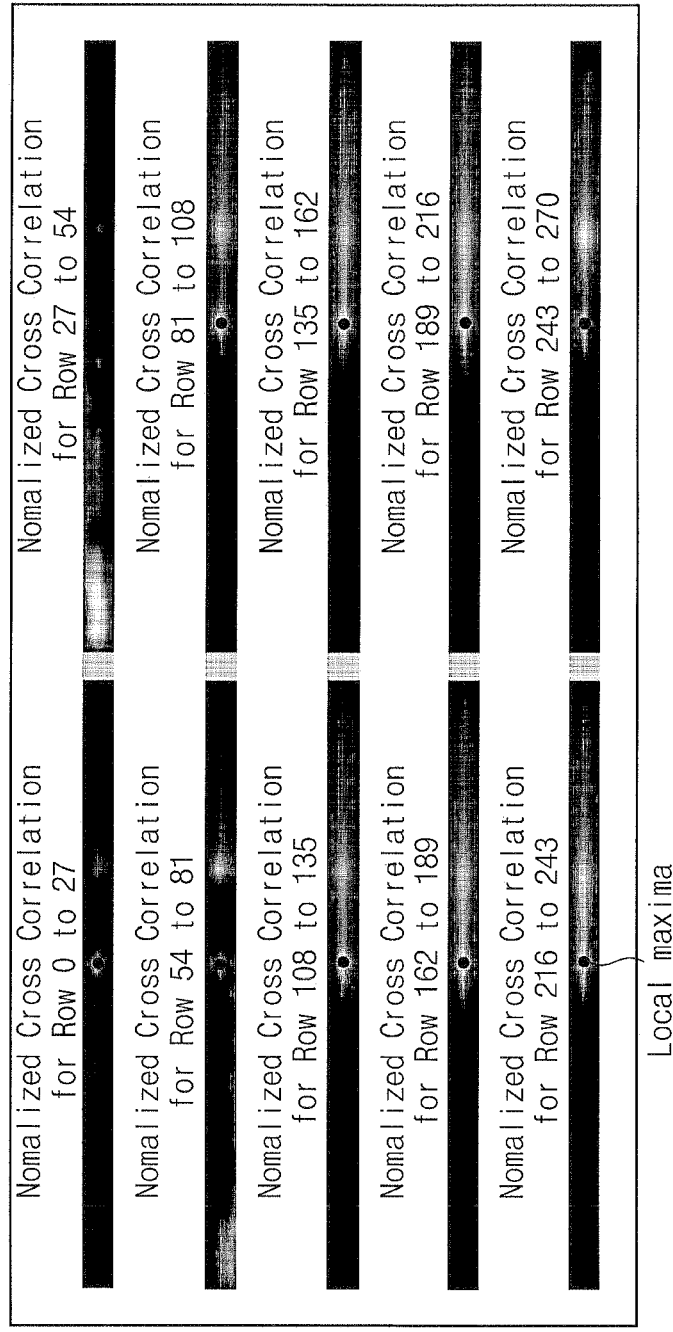
Figure 5C:
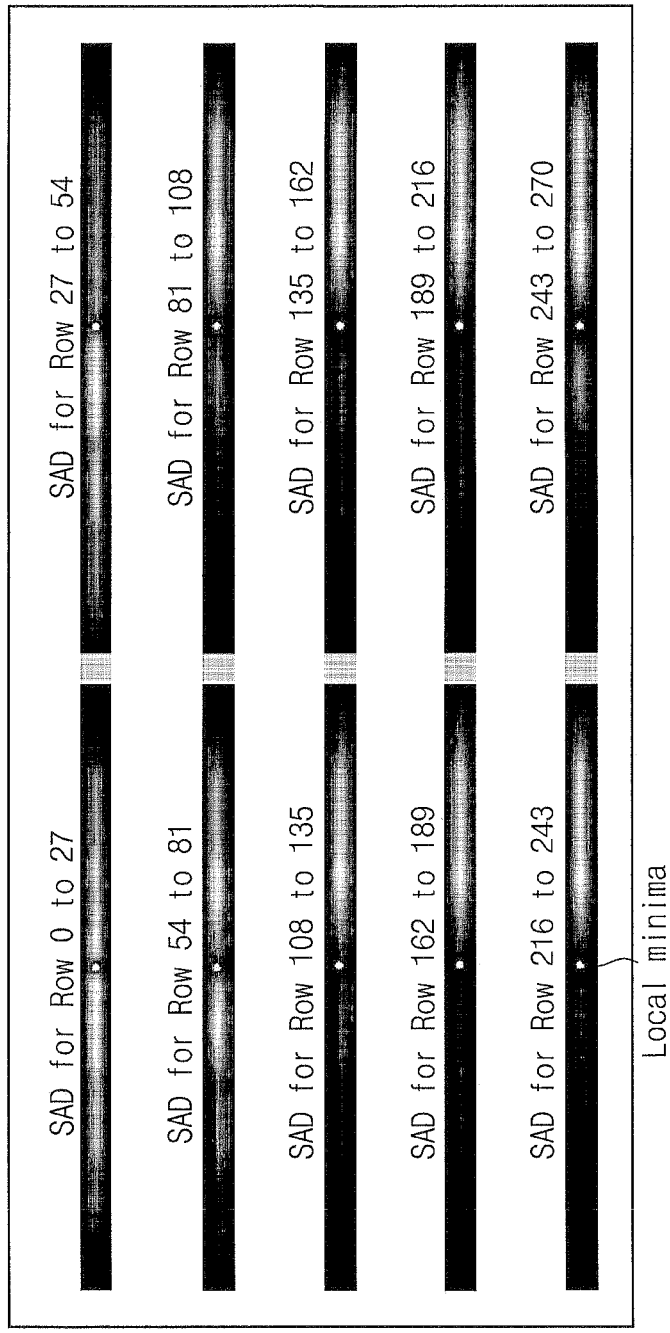

FIGS. 5A to 5C illustrate image distortion and more specifically illustrate step S130 in the method of FIG. 3. In FIGS. 5B and 5C, results of NCC and SAD with respect to first and second frames each including 270 row blocks are shown, respectively. However, it is just exemplary and the inventive concept is not limited thereto.

In this example, each of the row blocks of the first and second frames is grouped into ten row banks. Thus, each of the row banks includes nine row blocks.

FIG. 5A shows an exemplarily first frame and a second frame.

Referring to FIG. 5B, the result of calculating NCC with respect to the row banks of the first and second frames in FIG. 5A is shown. The calculation unit 121 of the image processor 120 calculates NCC by using the above-described Equation (1). The detection unit 122 detects local maxima from the result of the NCC with respect to the respective row banks.

Referring to FIG. 5C, a result of calculating SAD with respect to the row banks of the first and second frames in FIG. 5A is shown. The calculation unit 121 of the image processor 120 calculates SAD by using the above-described Equation (2). The detection unit 122 detects local minima from the result of the SAD with respect to the respective row banks.

FIGS. 6, 7 and 8 illustrate examples of two sequential frames to which the motion estimation method of FIG. 3 is applied.

In FIGS. 6, 7 and 8, it is assumed that a first frame and a second frame each include 270 row blocks (row) and 480 column blocks (columns). In addition, let it be assumed that there are 30 row banks each bank including nine row blocks. In addition, it is assumed that time $T_{frame}$ between the first frame and the second frame is one second. In addition, it is assumed that time $T_{line}$ between row blocks constituting each frame is 1/4.5 second. For the convenience of description, it is assumed this is a case where an image sensor 110 horizontally moves.

FIG. 6 shows a first frame and a second frame (successive frames) in the case where the image sensor 110 moves at constant velocity and the acceleration (i.e., change of velocity) is zero. Specifically, the first frame and the second frame indicate successive image frames captured when the image sensor 110 horizontally moves at a velocity of 1050 [pixels/sec].

A result obtained by applying the motion estimation method according to an embodiment of the inventive concept was that the calculated velocity was 1085.54 [pixels/sec] and the calculated acceleration was −108.12 [pixels/sec$^2$]. From this result, it was confirmed that a relatively accurate motion coefficient between frames could be estimated even when the image sensor 110 moves at constant velocity.

FIG. 7 shows successive image frames captured when initial velocity of the image sensor 110 is zero and moves at constant acceleration (i.e., velocity change is constant over the time period). Thus, the first frame is an image frame captured when the image sensor 110 is stationary and the second frame is an image frame captured while the image sensor 110 moves at the constant acceleration and time $T_{frame}$ passes. The acceleration was set to 19,800 [pixels/sec$^2$].

A result obtained by applying the motion estimation method was that calculated velocity was −399.7842 [pixels/sec] and calculated acceleration was 19701.89 [pixels/sec$^2$]. From this result, it was confirmed that a relatively accurate motion coefficient between frames could be estimated even when the image sensor 110 moves at constant acceleration.

FIG. 8 shows image frames captured when the image sensor 110 has constant acceleration after moving at a constant velocity. Thus, a first frame is an image frame captured while the image sensor 110 moves at velocity of 1500 [pixels/sec] and the second frame is an image frame captured after the image sensor 110 moves with constant acceleration of 12,600 [pixels/sec$^2$] and time $T_{frame}$ passes.

A result obtained by applying the motion estimation method was that calculated velocity was 1245.16 [pixels/sec] and calculated acceleration was 13052.5 [pixels/sec$^2$]. From the result, it was confirmed that a relatively accurate motion coefficient between frames could be estimated even when the image sensor 110 moves at constant acceleration.

Figure 9:
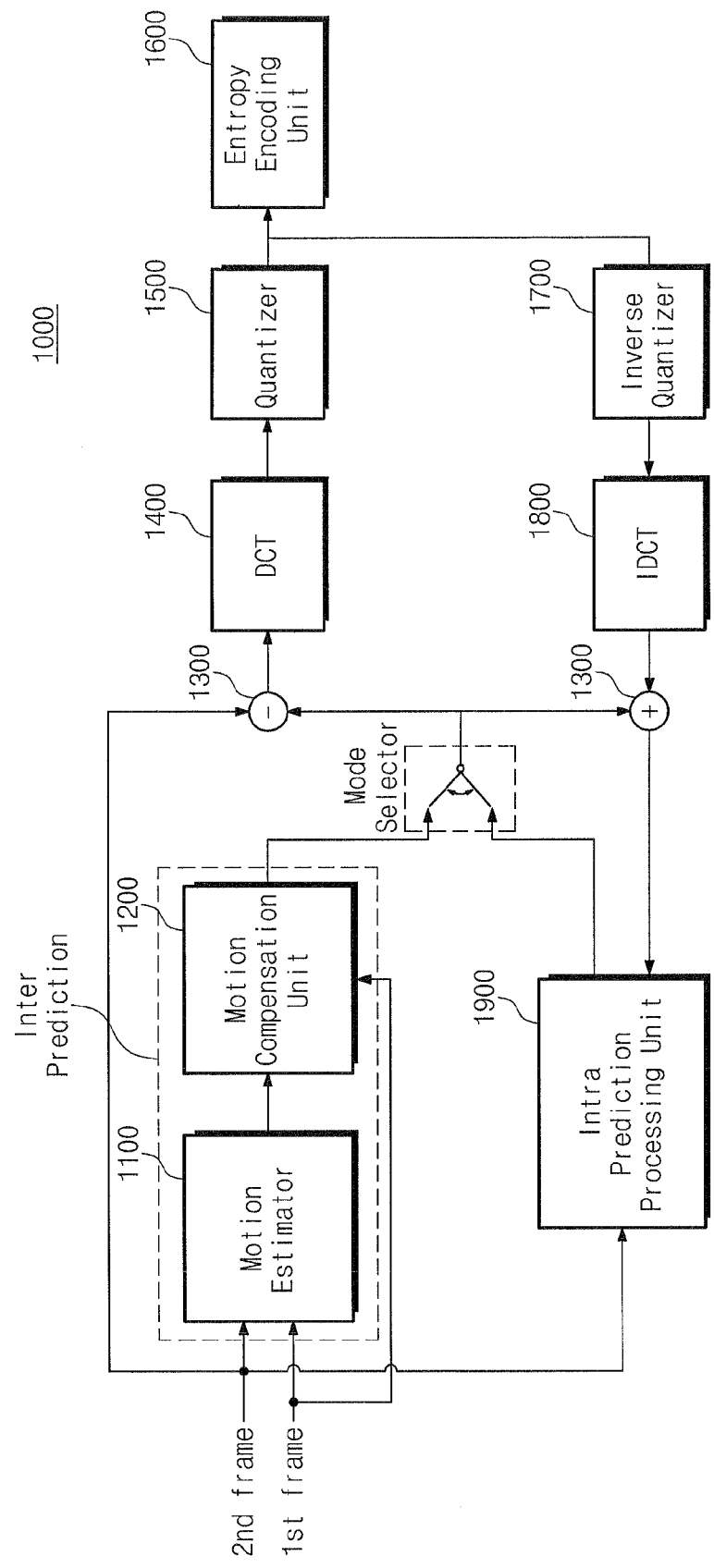
FIG. 9 is a block diagram of a video encoding device according to an exemplary embodiment of the inventive concept.

FIG. 9 is a block diagram of a video encoding device 1000 according to an exemplary embodiment of the inventive concept. As shown, the video encoding device 1000 includes a motion estimator 1100, a motion compensation unit 1200, an adder/subtractor 1300, a discrete cosine transform (DCT) 1400, a quantizer 1500, an entropy encoding unit 1600, an inverse quantizer 1700, an inverse DCT (IDCT) 1800, a mode selector, and an intra prediction processing unit 1900.

The video encoding device 1000 may alternately operate in an inter prediction mode or an intra prediction mode according to the control of the mode selector.

The motion estimator 1100 receives a previous image frame (e.g., first frame) stored in an internal memory (not shown) and a current image frame (e.g., second frame) captured by an image sensor (not shown). The motion estimator 1100 designates a specific macro block and estimates a motion vector with respect to the designated macro block. The motion estimator 1100 may include the image processor 120 shown in FIG. 1. For example, the motion estimator 1100 may generate a motion vector using relative displacements estimated by the image processor 120.

The motion compensation unit 1200 performs motion compensation with respect to the first frame by using the motion vector transferred from the motion estimator 1100 and transfers a motion-compensated frame to the subtractor 1300.

The subtractor 1300 receives the motion-compensated frame and the second frame to generate a difference vector.

The DCT 1400 transforms the difference frame in a manner of discrete cosine transformation. A DCT coefficient is generated according to the result of the discrete cosine transformation, and the DCT 1400 transfers generated DCT coefficients to the quantizer 1500.

The quantizer 1500 quantizes the DCT coefficients transferred from the DCT 1400.

The entropy encoding unit 1600 encodes the quantized DCT coefficients to generate an output bit stream. The entropy encoding unit 1600 generates the output bit stream by means of, for example, arithmetic coding, variable length coding, Huffman coding or the like.

The inverse quantizer 1700 inversely quantizes the quantized DCT coefficients.

The IDCT 1800 transforms the DCT coefficients transferred from the inverse quantizer 1700 in a manner of inverse discrete cosine transformation.

The intra-prediction processing unit 1900 processes a current image frame (e.g., second frame) captured by an image sensor (not shown) and an output frame transferred from the IDCT 1800 using a result value of the inverse discrete cosine transformation. Unlike a prediction result within a screen (i.e., the output frame of the motion compensation unit 1200), the output frame may accompany motion compensation.

Figure 10:
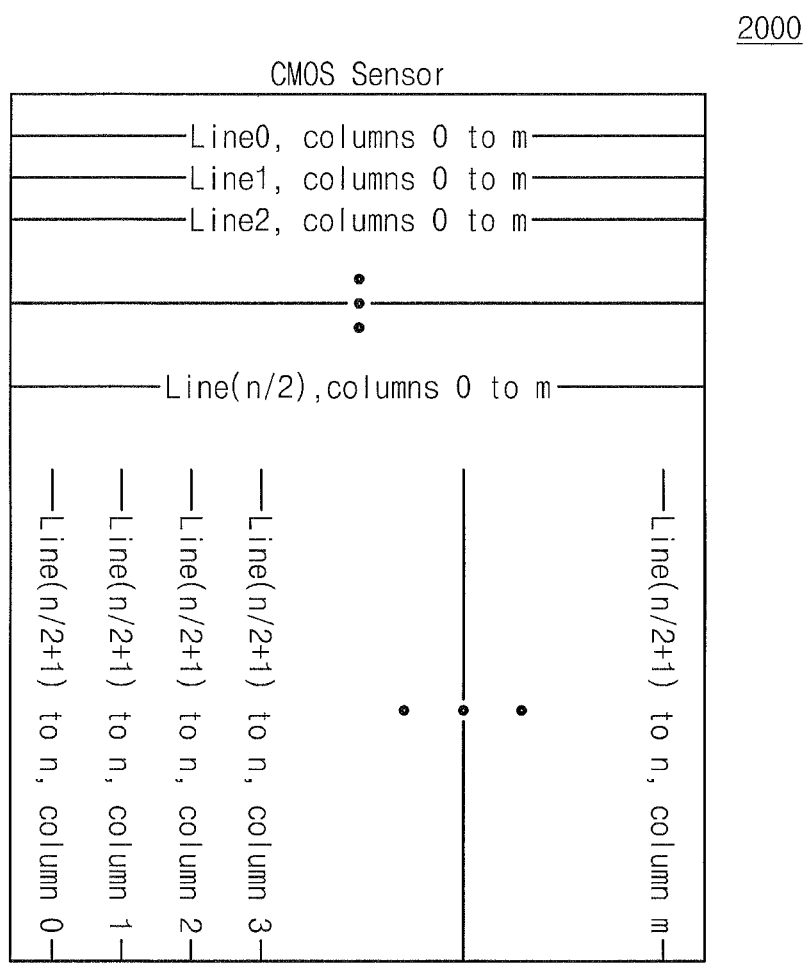
FIG. 10 illustrates a two-dimensional image sensor according to an exemplary embodiment of the inventive concept.

FIG. 10 illustrates a two-dimensional image sensor 2000 according to an exemplary embodiment of the inventive concept. The two-dimensional image sensor 200 can be implemented as a CMOS image sensor. In general, two orthogonal image sensors are used to estimate two-dimensional motion.

However, the two-dimensional image sensor 2000 scans half the overall image (Line 0~Line n/2) in units of row blocks and scans the other half of the image (Line n/2+1~Line n) in units of column blocks. Thus, two-dimensional motion may be estimated using a single CMOS image sensor. A motion estimation device according to an exemplary embodiment of the inventive concept may use the two-dimensional image sensor 2000 shown in FIG. 10 instead of the image sensor 110 shown in FIG. 1.

Figure 11:
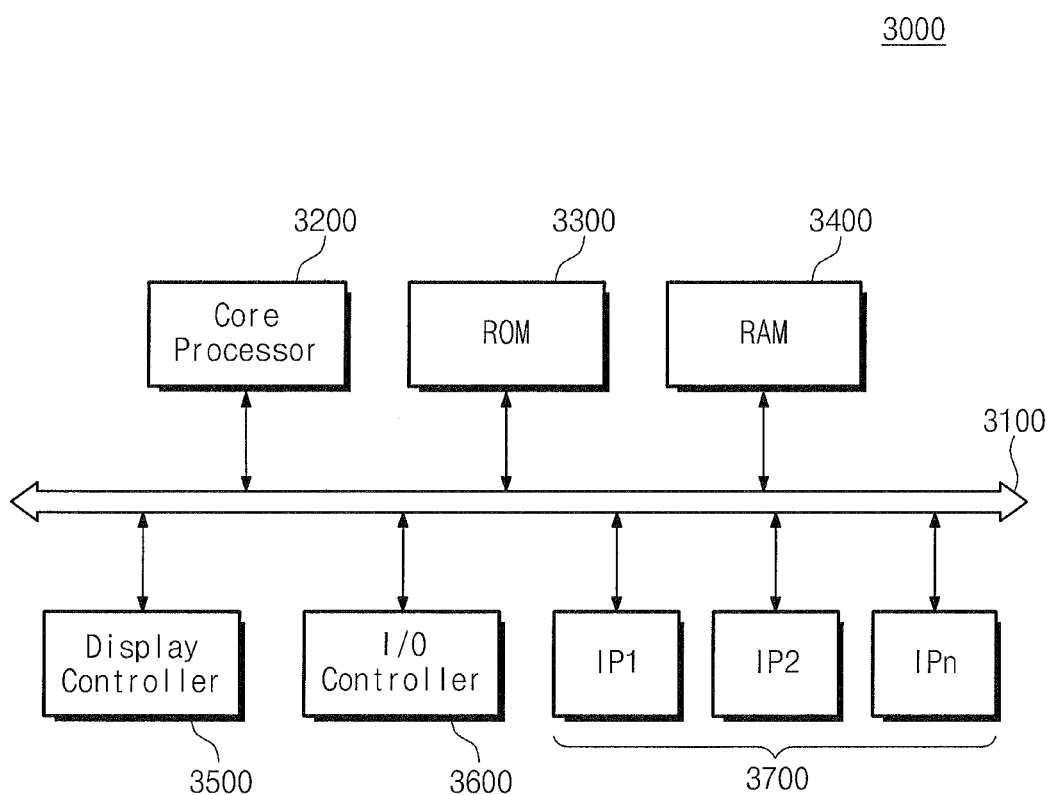
FIG. 11 is a block diagram of an application processor according to an exemplary embodiment of the inventive concept.

FIG. 11 is a block diagram of an application processor 3000 according to an exemplary embodiment of the inventive concept. As shown, the application processor 3000 includes an internal bus 3100, a core processor 3200, a read only memory (ROM) 3300, a random access memory (RAM) 3400, a display controller 3500, an input/output controller (I/O controller) 3600, and a plurality of dedicated intellectual property circuits (IPs, e.g., IP1, IP2, and IPn) 3700 (n being an integer equal to or greater than 3).

The internal bus 3100 provides a data channel between components 3200, 3300, 3400, 3500, 3600, 3700 of the application processors 3000.

The core processor 3200 controls the components 3300, 3400, 3500, 3600, 3700 of the application processor 3000 and performs various logical operations.

The ROM 3300 may store executable code data for operating (e.g., boot code for booting) the core processor 3200.

The RAM 3400 may be used as a working memory of the core processor 3200 and includes at least one of random access memories such as DRAM, SRAM, PRAM, MRAM, RRAM, and FRAM.

The display controller 3500 controls connections and the operation of display devices, for example, liquid crystal display (LCD), active matrix organic light emitting diode (AMOLED) display device, and so on.

The I/O controller 3600 controls connections and operations of input/output devices, for example, keyboard, printer, network interface device, and so on.

The IPs 3700 may include, for example, a direct memory access (DMA) controller, an image processor (ISP), and so on. One (e.g., IP1) of the IPs 3700 may include the image processor 120 described with referenced to FIG. 1. In this case, the IP1 functions as an image processor (ISP) and performs operations on image data to assist the core processor 3200. In addition, the IP1 may further include a configuration such as a motion compensation unit.

Figure 12:
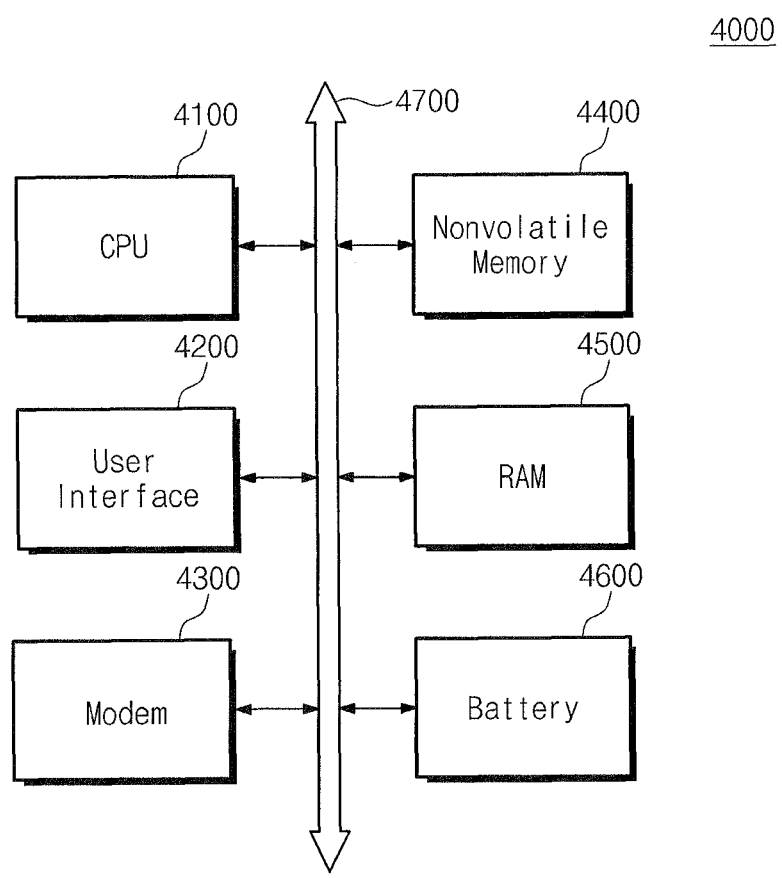
FIG. 12 is a block diagram of a mobile device including the application processor of FIG. 11.

FIG. 12 is a block diagram of a mobile device 4000 including the application processor 4000 of FIG. 11. As shown, the mobile device 4000 includes an application processor (CPU) 4100, a user interface 4200, a modem 4300, a nonvolatile memory 4400, a main memory 4500, a battery 4600, and a system bus 4700.

The system bus 4700 provides a data channel between components of the mobile device 4000.

The application processor (CPU) 4100 may be the main processor of the mobile device 4000. The application processor 4100 controls components of the mobile device 4000, executes an operating system (OS) and applications, and performs logical operations. The application processor 4100 may be implemented as a system-on-chip (SoC). The application processor (CPU) 4100 may have the same configuration as described with reference to 3200 in FIG. 11.

The user interface 4200 exchanges data with a user. The user interface 4200 may include user input interfaces such as camera, microphone, keyboard, mouse, touch pad, touch panel, touch screen, button, and switch. The user interface 4200 may include user output interfaces such as display device, speaker, lamp, and motor. The display device may include an LCD, an AMOLED display device, a beam projector, and so on.

The modem 4300 can communicate with an external device through a wired or a wireless channel. The modem 4300 may communicate with an external device, based on communication systems such as LTE, CDMA, GSM, WiFi, WiMax, NFC, Bluetooth, and RFID.

The nonvolatile memory 4400 can store data required for long-term preservation in the mobile device 4000. The nonvolatile memory 4400 may include at least one of flash memory, MRAM, PRAM, RRAM, FRAM, hard disk drive, and so on.

The main memory 4500 can be a working memory of the mobile device 4000. The main memory 4500 can include at least one of random access memories such as DRAM, SRAM, PRAM, MRAM, RRAM, and FRAM.

The battery 4600 may supply electrical power to the mobile device 1000.

A motion estimation method according to an embodiment of the inventive concept can be implemented in the form of program commands executed through various computing devices and may be recorded in recording media recordable by and readable by a computer.

Examples of the computer-readable/recordable media may include a magnetic media such as hard disk, floppy disk, and magnetic tape, an optical media such as CD-ROM and CVD, a magneto-optical media such as floptical media, and a hardware device such as ROM, RAM, and flash memory specifically configured to store executable program commands. Examples of the program commands include not only machine codes generated by a compiler but also high-level language codes executed by a computer using an interpreter. The hardware device may be configured to act as one or more software modules to perform steps of the inventive concept, and vice versa.

According to the motion estimation device and method described above, motion can be estimated with respect to successive first and second image frames. In addition, motion coefficients (e.g., velocity, acceleration, jolt, etc.) can be calculated with respect to successive image frames.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A motion estimation method comprising:
grouping the row blocks of a first frame into a first plurality of banks and grouping the row blocks of a second frame into a second plurality of corresponding banks, wherein one row block in each of the first plurality of banks is deemed a reference row block;
calculating the normalized cross correlation (NCC) or the sum of absolute difference (SAD) between the banks of the first frame and the banks of the second frame;
detecting the local maxima of the NCC or the local minima of the SAD;
estimating a first relative displacement between the reference row blocks of the respective banks of the first frame and the corresponding banks of the second frame by using the detected local maxima or the detected local minima;
calculating motion coefficients of the reference row blocks by using the first relative displacement; and estimating second relative displacement between the corresponding row blocks of the first frame and the second frame by using the motion coefficients.

2. The motion estimation method as set forth in claim 1, wherein the first frame and the second frame are image frames that are successive in time.

3. The motion estimation method as set forth in claim 1, wherein calculating motion coefficients of the reference row blocks by using the first relative displacement comprises:
calculating the motion coefficients based on a motion equation describing motion between the reference row blocks of the corresponding banks of the first frame and of the second frame.

4. The motion estimation method as set forth in claim 3, wherein the motion equation is derived based on a motion equation describing motion between the row blocks of the first frame and the row blocks of the second frame.

5. The motion estimation method as set forth in claim 3, wherein the motion coefficients include velocity, acceleration, and jolt.

6. The motion estimation method as set forth in claim 1, wherein each of the banks includes one reference row block and at least one other row block.

7. The motion estimation method as set forth in claim 1, wherein the banks of the first frame and the banks of the second frame include the same number of row blocks.

8. A motion estimation device comprising:
an image processor configured to process a first frame and a second frame that are sequentially input and configured to group the plurality of row blocks of the first frame into a first plurality of banks and configured to group the plurality of row blocks of the second frame into a second plurality of banks, and
wherein the image processor comprises:
a calculation unit configured to calculate the normalized cross correlation (NCC) or the sum of absolute difference (SAD) between the banks of the first frame and the corresponding banks of the second frame;
a detection unit configured to detect the local maxima of the NCC or the local minima of the SAD; and
an estimation unit configured to estimate a first relative displacement between the reference row blocks of the corresponding banks of the first frame and of the second frame by using the local maxima or the local minima,
wherein the calculation unit calculates a motion coefficient between the reference row blocks by using the first relative displacement, and
wherein the estimation unit estimates a second relative displacement between corresponding row blocks of the first frame and of the second frame by using the motion coefficient.

9. The motion estimation device as set forth in claim 8, further comprising:
an image sensor configured to generate the first frame and the second frame,
wherein the image sensor is a CMOS image sensor, and
wherein the CMOS image sensor generates the first and second frames.

10. The motion estimation device as set forth in claim 9, wherein the image sensor uses a rolling shutter scheme.

11. The motion estimation device as set forth in claim 8, wherein the first and second frames are image frames that are successive in time.

12. The motion estimation device as set forth in claim 11, wherein each of the banks of the first frame includes one reference row block, and wherein each of the banks of the second frame includes one corresponding reference row block.

13. The motion estimation device as set forth in claim 11, wherein the motion coefficient includes velocity, acceleration, and jolt, and
wherein the calculation unit calculates the motion coefficients, based on a motion equation describing motion between the corresponding reference row blocks of the first frame and of the second frame.

14. The motion estimation device as set forth in claim 11, wherein the estimation unit estimates the second relative displacement, based on a motion equation describing motion between the row blocks of the first frame and the corresponding row blocks of the second frame.

15. The motion estimation device as set forth in claim 11, wherein the banks of the first frame and the banks of the second frame have the same number of the reference row blocks.

16. A motion estimation method comprising:
dividing the row blocks of a first frame of a scene into a first plurality of banks;
dividing the row blocks of a second frame of the scene into a second plurality of corresponding banks;
deeming one row block in each of the banks as a reference row block;
estimating a first relative displacement between the reference row blocks of the corresponding banks of the first frame and of the second frame by using the local maxima the normalized cross correlation (NCC) or the local minima of the sum of absolute difference (SAD), wherein one of the NCC and the SAD between the first frame and the second frame is calculated for each pair of corresponding banks;
calculating motion coefficients of the reference row blocks by using the first relative displacement; and
estimating a second relative displacement between the corresponding row blocks of the first frame and the second frame by using the motion coefficients.

17. The motion estimation method as set forth in claim 16, wherein the first frame and the second frame are image frames that are successive in time.

18. The motion estimation method as set forth in claim 1, wherein calculating motion coefficients of the reference row blocks by using the first relative displacement comprises:
calculating the motion coefficients based on a motion equation describing motion between the reference row blocks of the corresponding banks of the first frame and of the second frame.

* * * * *